United States Patent [19]

Hiraiwa et al.

[11] Patent Number: 5,490,135
[45] Date of Patent: Feb. 6, 1996

[54] METHOD AND SYSTEM FOR ARRANGING COMMON CHANNEL SIGNAL NETWORK THROUGH ISDN

[75] Inventors: Masashi Hiraiwa; Yoshiaki Asambo, both of Yokohama; Noboru Mizuhara, Kawasaki, all of Japan

[73] Assignees: Hitachi, Ltd., Tokyo; Hitachi Software Engineering Co., Ltd., Yokohama, both of Japan

[21] Appl. No.: 577,489

[22] Filed: Sep. 5, 1990

[30] Foreign Application Priority Data

Sep. 8, 1989 [JP] Japan .................................. 1-231693

[51] Int. Cl.$^6$ ................................................ H04J 3/12
[52] U.S. Cl. ............................ 370/16.000; 370/68.100
[58] Field of Search ............................ 370/110.1, 60, 370/17, 58.1, 80, 79, 16, 68.1; 340/825.02, 827, 825.01; 379/221, 207, 213, 230, 214, 201, 91–95; 371/11.1, 11.2, 8.1, 8.2

[56] References Cited

U.S. PATENT DOCUMENTS

| | | | |
|---|---|---|---|
| 4,119,815 | 10/1978 | Frankfort et al. | 379/221 |
| 4,558,444 | 12/1985 | Kennedy et al. | 370/110.1 |
| 4,680,776 | 7/1987 | Ikeuchi et al. | 370/16 |
| 4,890,280 | 12/1989 | Hirata | 370/60 |
| 4,899,337 | 2/1990 | Hirai | 370/80 |
| 4,905,237 | 2/1990 | Voelzke | 370/110.1 |
| 5,027,343 | 6/1991 | Chan et al. | 370/17 |
| 5,072,440 | 12/1991 | Isono et al. | 340/827 |
| 5,119,415 | 6/1992 | Aoyama | 379/207 |
| 5,193,086 | 3/1993 | Satomi et al. | 370/16 |

FOREIGN PATENT DOCUMENTS 61-10347  1/1986  Japan .............................. H04L 11/20

Primary Examiner—Benedict V. Safourek
Assistant Examiner—Dang Ton
Attorney, Agent, or Firm—Antonelli, Terry, Stout & Kraus

[57] ABSTRACT

A method and system for arranging a common channel signal through an ISDN in a switching network. In the switching network, a signal is transferred between the switching stations in a common channel signalling manner. This method and system serves to allocate a signal path between the stations through the ISDN without having to provide a dedicated channel between the stations as a common channel signal path. Then, the method and system establishes a temporary connection between the stations through the ISDN using a channel in the ISDN (for example, D channel) used for controlling the call setup between the ISDN and a terminal and transfers a common channel signal between the stations by transferring transparent user information to the ISDN. In the common channel signal network in which a common channel signal is transferred through a leased line, the signal transfer is switched from the leased line to the ISDN when failure takes place in the common channel signal path.

7 Claims, 6 Drawing Sheets

DPC : RECEIVE STATION NUMBER
OPC : SEND STATION NUMBER
CIC : LINE NUMBER

ID METHOD AND SYSTEM FOR ARRANGING COMMON CHANNEL SIGNAL NETWORK THROUGH ISDN

BACKGROUND OF THE INVENTION

The present invention relates to a method and system for arranging a common line signal network through an ISDN (Integrated Service Digital Network) in a switching network in which a signal is transferred between switching stations through a leased line in a common channel signalling manner. More particularly, the invention relates to a method and a system for alternating a common channel signal path using the ISDN in a common channel signal network in which a signal is transferred through a leased line.

The conventional local switching network includes local switching stations and leased lines connecting the local switching stations. For using the leased lines, the contract is made on a line number and a using period. Recently, there has been a strong desire for expanding the service inside of one switching station to that between the switching stations. For achieving the service between the switching stations, a common channel signalling system has been used. The common channel signalling system is designed to transfer a signal between switching stations through a common signal line provided independently of a speech channel. The system thus makes it possible to transfer a signal during speech as well as without any concern with a call. If the switching network employs the conventional leased lines and a common channel signalling system for transferring a signal between switching stations, the network is designed to transfer a signal between switching stations by allocating a specific channel of the leased lines to a common channel signalling path. This kind of common channel signalling system has been disclosed in Japanese patent application laid-open No. JP-A-61-10347.

As described above, the foregoing conventional technology is designed so that a switching station allocates a specific channel of the leased lines to an object switching station in a fixed manner. Hence, if the switching station has only a small number of lines, the conventional technology lowers the efficiency of use of the leased lines.

SUMMARY OF THE INVENTION

In order to overcome the shortcoming, it is therefore an object of the present invention to provide a method and a system for arranging a common channel signal network through an ISDN which method and system are capable of making the most use of lines.

It is another object of the present invention to provide a method and a system for arranging a common channel signal network which method and system have a reduced number of signal devices used in the arrangement.

To achieve the foregoing objects, according to an aspect of the invention, the method and system for arranging a common channel signal network through an ISDN is designed to allocate a signal path between the switching stations through an ISDN if necessary without providing a leased signal channel served as a common channel signal path between both stations, establish a temporary connection between both switching stations through the ISDN using a channel (for example, D channel) employed for setting up a call between the ISDN and the terminal, and transfer transparent user information (for example, UUI or D channel packet) to the ISDN for the purpose of realizing signal transfer between the switching stations. Further, for the common channel signal network in which a signal is transferred through a leased line, the method is used for switching the common channel signal network to the ISDN if failure takes place in the common channel signal network.

The foregoing method and system for arranging a common channel signalling network through an ISDN is capable of transferring a signal between the switching stations by, if necessary, establishing a connection between both of the stations using a channel (D channel) employed for setting up a call between the ISDN and a terminal. Hence, the method makes it possible to improve the efficiency of use of the lines, because it requires no leased signal device and does not exclusively use a leased-line channel as a signal path. This function can reduce the cost of the signalling device and improve the efficiency of use of the lines. In the common channel signalling network in which a common channel signal is transferred through a leased line, the signalling device and the signal path may often employ redundant arrangements as a result of considering the operation of them at the failure time. If, therefore, failure takes place in the signal device and the signalling path, the ISDN signal path may be used as an alternate path, thereby making efficient use of the lines and reducing the cost of the signalling device.

DESCRIPTION OF THE PREFERRED EMBODIMENTS

Herein, a description will be directed to an embodiment of the invention with reference to FIGS. 1 to 5.

Figure 1:
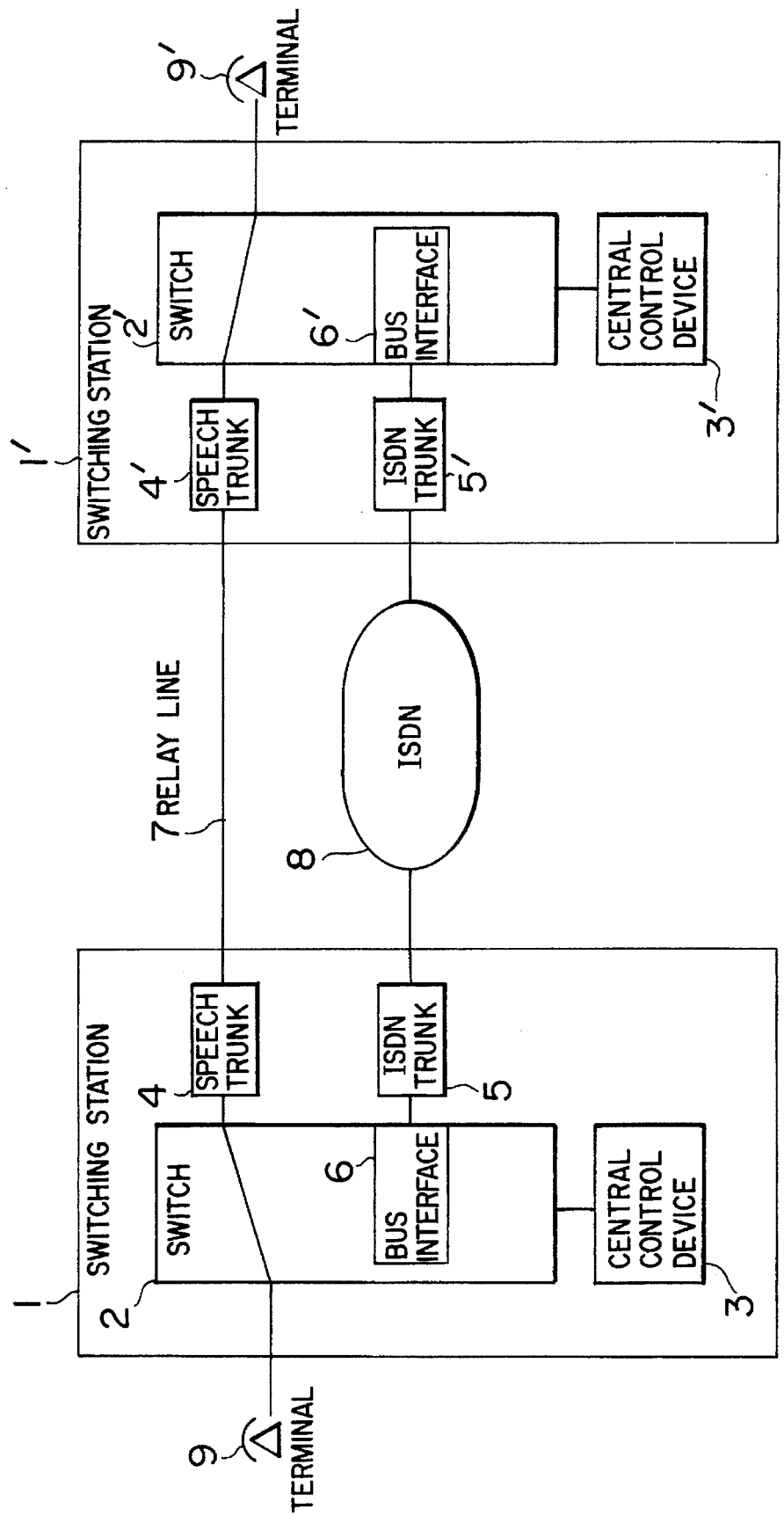
FIG. 1 is a block diagram illustrating how to arrange a common channel signalling network through an ISDN according to an embodiment of the invention.

FIG. 1 shows a common channel signal relaying system, which is used for illustrating a method and system for arranging a common channel signal network through an ISDN designed according to an embodiment of the invention. As shown in FIG. 1, 1 and 1' denote switching stations, which respectively includes switches 2, 2', central control devices 3, 3', speech trunks 4, 4', ISDN trunks 5, 5' used for connecting an ISDN, bus interface units 6, 6' through which the central control devices 3, 3' control the ISDN trunks 5, 5', a relay line 7 used by the speech trunks 4, 4', an ISDN 8 connected to the ISDN trunks 5, 5', and terminals 9, 9'. FIG. 1 shows logical arrangement of sections for transferring a common line signal through the ISDN 8, which is closely concerned with the invention. That is, the arrangement requires no sections and devices other than those the switching station normally requires.

In FIG. 1, the common channel signalling system employs the relay line 7 as a speech path for call setup between the terminals 9 and 9', while it employs a leased signal path provided independently of the speech path when transferring call setup information between the switching stations 1 and 1'. This design allows control information to be transferred between the switching stations 1 and 1' during the speech time as well as independently of a call. It results in enabling the system to perform various kinds of services. In this embodiment, the description will be expanded on the basis of the office network built by applying the common channel signalling system to a between-stations signalling system provided between local switching stations in the office. For building the office network, the relay line 7 normally employs a leased line. In case of applying the between-stations signalling system to the common channel signalling system, the conventional technology serves to allocate a specific channel of the leased lines to a common channel signal path. The present embodiment, on the other hand, serves to transfer the common channel signal between the switching stations 1 and 1' through a D channel. The D channel is normally used for transferring setup information between the network and the user in the ISDN 8.

Figure 2:
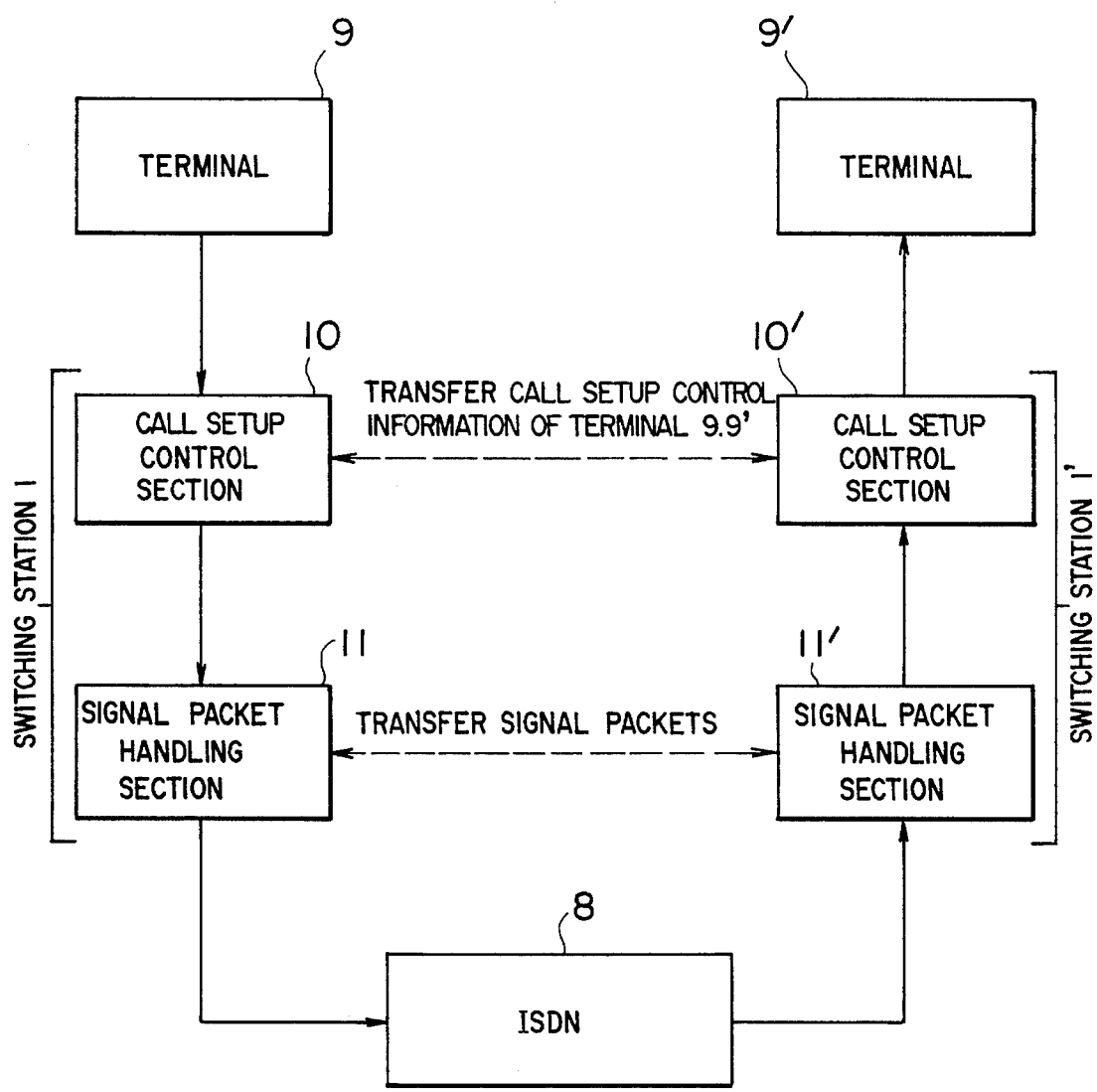
FIG. 2 is a functional block diagram showing the common line signalling method shown in FIG. 1.
Figure 3:
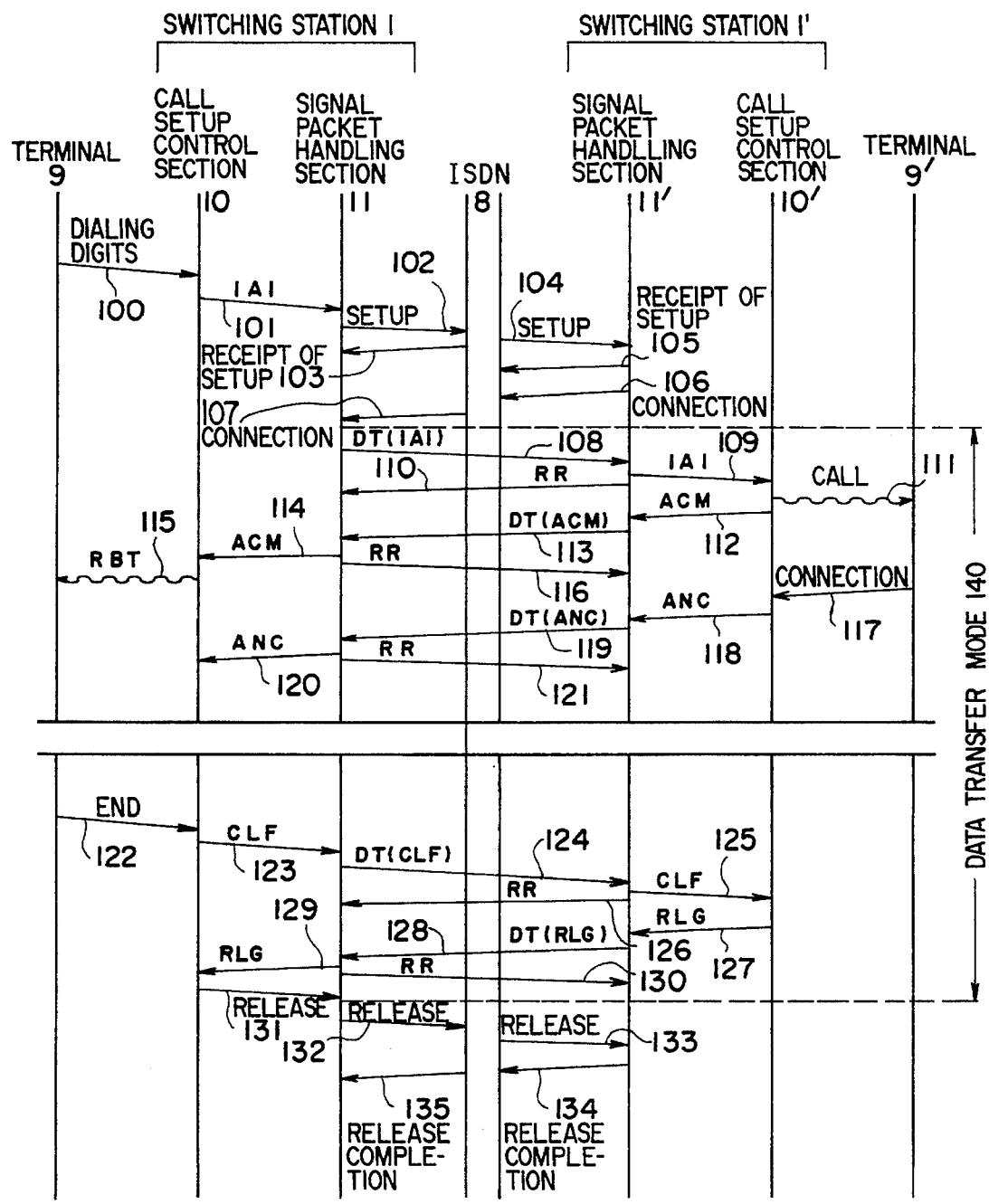
FIG. 3 is a view showing a call setup control sequence implemented on the method shown in FIG. 2.

FIG. 2 is a functional block diagram showing how to transfer a common channel signal through the D channel shown in FIG. 1. In FIG. 2, the function arrangement (mainly, central control devices 3, 3') about the transfer of a common channel signal between the switching stations 1, 1' consists of setup control sections 10, 10' and signal packet handling sections 11, 11'. The setup control sections 10, 10' serve to perform the setup controls such as interpretation of dialing digits sent from a terminal or another station, selection of the speech trunks 4, 4', and control of a speech path between the terminal and the speech trunk. The common channel signal designed according to the format regulated on the CCITT recommendation is transferred between the setup control sections 10 and 10' of the switching stations 1 and 1' in a manner to control the call setup between the terminals 9 and 9'. The signal packet handling sections 11, 11' have a function of transferring common channel signals to be sent to the call setup control sections 10, 10' between the switching stations 1 and 1' through the ISDN 8. Further, these sections 11, 11' perform edition of signal packets, routing of signal packets, I/O control of the common channel signal to or from the D channel, and transfer control of the common channel signal to the call setup control sections 10, 10' so that a temporary connection for transferring signal packets is established between the signal packet handling sections 11, 11' of the switching stations 1, 1'. The temporary connection denotes such a connection between the terminals 9 and 9' as enabling a user signal to be transferred without establishing a circuit-switching call through the ISDN 8. FIG. 3 shows a call setup control sequence using the common channel signal shown in FIG. 2. In FIG. 3, when the switching station 1 calls the terminal 9, the setup control section 10 serves to interpret dialing information (100) of another station. If another station is the terminal 9' of the switching station 1' having a route connected by the common line, the setup control section 10 selects the speech trunk 4 for the switching station 1' and sends out a start signal 1A1 (101) to the switching station 1' through the common channel signal.

Figure 4:
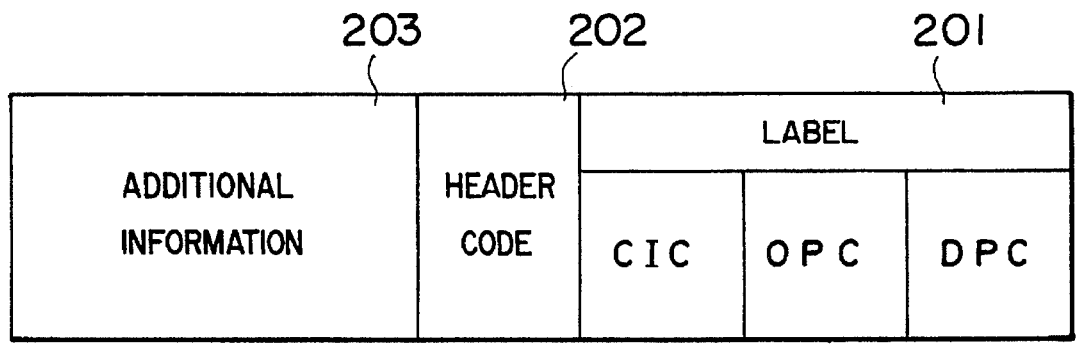
FIG. 4 is a view showing a common channel signalling format used in the method shown in FIG. 2.

FIG. 4 shows a common channel signal format used in the call setup control sections 10, 10' employing the common channel signalling system shown in FIG. 2. The shown format is a CCITT-recommended normal signal format used for controlling the call setup between the stations and consists of a label 201, a header code 202 and additional information 203. The label 201 consists of a receive station number DPC, a send station number OPC and a speech line number CIC. The call setup control sections 10, 10' of the switching stations 1, 1' use the label 201 for identifying a call. The header code 202 indicates a type of a signal to be transferred by the call setup control sections 10, 10'. The additional information 203 means data defined at each signal. For example, the start signal IAI contains additional information such as a selecting number and a call type of another terminal distributed according to the prescribed allocation.

The signal packet handling section 11 receives a transfer request of the common channel signal employing the signal format shown in FIG. 4 edited in the setup control section 10 shown in FIG. 3. It serves to select the ISDN trunk 5 as an output path for the purpose of transferring the common channel signal to another switching station 1' through the D channel containing the ISDN 8. The common channel signal transferred from the call setup control section 10 is edited to a signal packet format and then output to the D channel. Unless a temporary connection for transferring signal packets is established between both the signal packet handling sections 11, 11' and the switching stations 1, 1', it is necessary to establish the connection according to the following procedure. The temporary connection for transferring signal packets is established on the procedure about a circuit-switching call setup between the ISDN and a user.

Figure 5A:
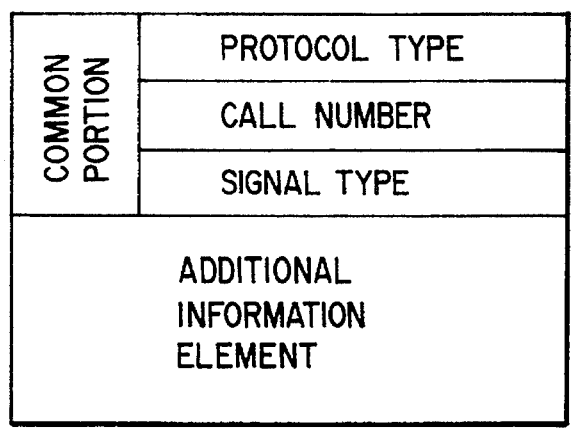
FIGS. 5A and 5B are views showing a signal packet format used in the method shown in FIG. 2.
Figure 5B:
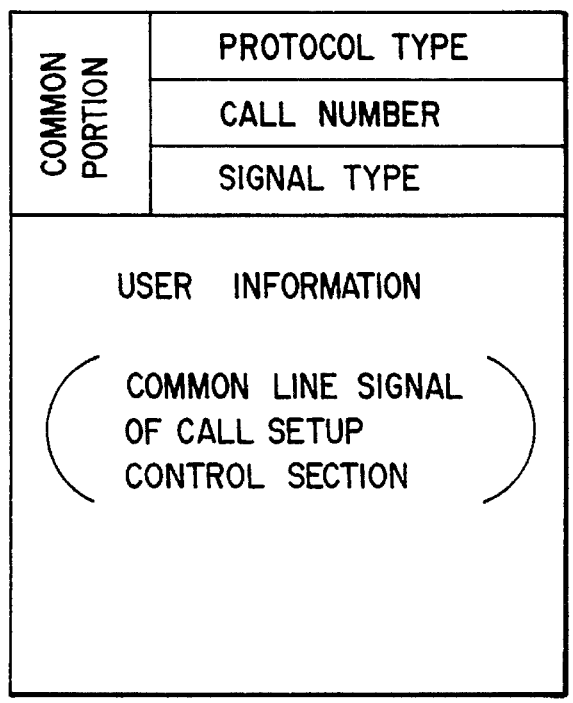

FIGS. 5A and 5B show signal packet formats provided in the signal packet handling sections 11, 11' shown in FIG. 3. FIG. 5A shows a signal packet format (see 102 to 107 shown in FIG. 3) designed according to a network-user interface regulation for establishing a temporary connection through the ISDN 8. FIG. 5B shows a signal packet format (see 108 to 131 shown in FIG. 3) used in a data transfer mode 140 of common channel signal information about the setup call to be transferred from the call setup control sections 10, 10'. After establishing the temporary connection, the signal packet shown in FIG. 5B, that is, the packet used in the data transfer mode transfers the transparent user information indicated therein to another terminal (the signal packet handling section 11' of another station designed according to the embodiment) through the ISDN 8 if the signal type of the common portion concerns with the user information.

In response to a transfer request of the start signal IAI (101) of another station from the call setup control section 10, the signal packet handling section 11 shown in FIG. 3 established a temporary connection. Then, it serves to select the receive number of the ISDN trunk 5' based on a receiving station number DPC contained in the common channel signal information transferred from the call setup control section 10. And, it selects a transmit route to the ISDN 8 according to the normal route-selecting process. After establishing a temporary connection for the signal packet transfer, the signal packet handling sections 11, 11' enter into the data transfer mode 140 and send the signal to be transferred from the call setup control sections 10, 10' to the D channel of the ISDN 8 or transfer the signal to be input from the D channel to the call setup control sections 10, 10'. And, in the data transfer mode 140, the signal packet handling sections 11, 11' send back an acknowledge signal RR (110, 116, 121, 126, 130) to the sender for acknowledging the transfer of signal packets when they receive the signal packets (108, 113, 119, 124, 128) as indicated in the call setup sequence example. If the sender cannot obtain any acknowledge, the signal packet handling sections 11, 11' perform the re-transmitting process.

In the data transfer mode 140 shown in FIG. 3, the call setup control sections 10, 10' of the switching stations 1, 1' serve to establish calls of the terminals 9, 9' based on the setup procedure designed according to the normal CCITT recommendation. When the terminals 9, 9' finish each speech, the signal packet handling sections 11, 11' have already established the temporary connection for transferring the signal packets. Hence, the setup control section 10 of the switching station 1 is capable of transferring a release signal CLF (123) to the call connection control section 10' of the switching station 1' in the data transfer mode (140). On the other hand, the switching station 1' serves to transfer a release signal RLG (127) to the switching station 1 in the data transfer mode (140). In response to the release signal RLG (129), the switching station 1 makes sure that the resource is released in the call setup control section 10 and sends out a request of releasing the temporary connection for transferring the signal packets to the signal packet handling section 11. In response to the request of releasing, the signal packet handling section 11 sends out a request (132) of releasing the signal packet format indicated in FIG. 5A to the ISDN 8 for the purpose of releasing the connection with another station.

The present embodiment makes it possible to establish a common channel signal path through the D channel of the ISDN without having to hold a leased signal path required for transferring call setup information between the switching stations in a common channel signalling manner.

Figure 6:
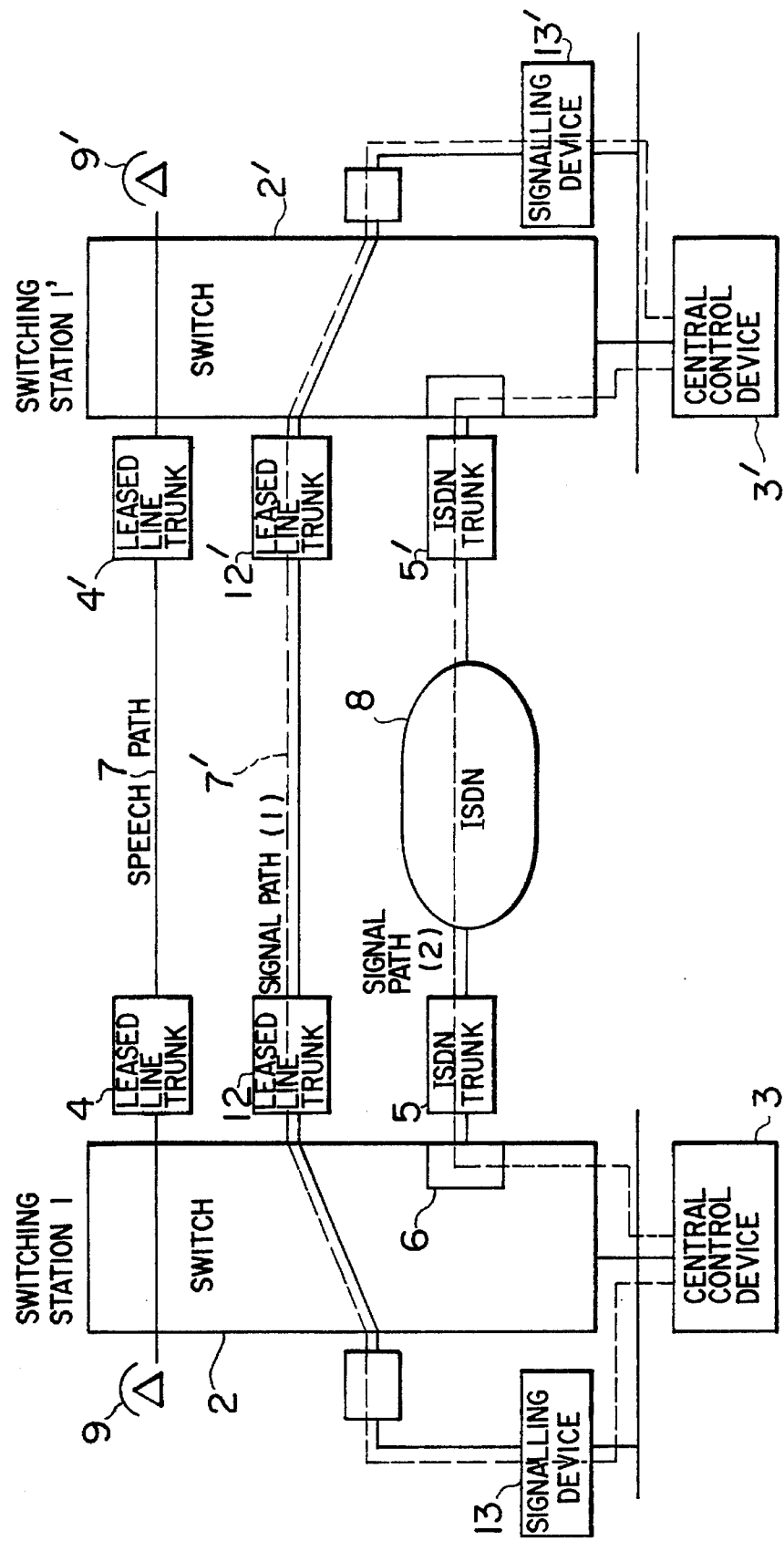
FIG. 6 is a block diagram showing how to alternate a common signal path through an ISDN according to the other embodiment of the invention.

FIG. 6 is a block diagram showing a common channel signal relay system, which indicates the other embodiment of a method and system for arranging a common channel signal network through the ISDN. In FIG. 6, the switching stations 1, 1' respectively include switches 2, 2', central control devices 3, 3', leased line trunks 4, 4', ISDN trunks 5, 5', bus interface units 6, 6', a relay line 7 used by the leased trunks 4, 4', an ISDN 8 connecting the ISDN trunks 5, 5', terminals 9, 9', leased line trunks 12, 12', a relay line 7' connected to the leased line trunks 12, 12', and signalling devices 13, 13'. The relay lines 7, 7' connected between the switching stations 1 and 1' shown in FIG. 6 employ leased lines. The signalling system between the switching stations 1 and 1' is a common line signalling system. It employs redundant arrangement, because failure may take place in the common channel signal path. One channel is allocated to the common channel signal path (1) through which a common channel signal can be transferred between the switching stations 1 and 1' using the dedicated signalling devices 13, 13'. And, the common channel signal path (2) is used for establishing a common channel signal path for a call through the ISDN 8 shown in FIG. 1.

The office network normally use the leased lines. The conventional technology has been designed to allocate a specific channel of the leased lines to the common channel signal path if the signalling system between the PBXs employs a common channel signalling system. On the other hand, the embodiment shown in FIG. 1 employs a method for allocating it to the common channel signal path through the ISDN. For the foregoing prior art, the charging unit is how long the leased line is leased, while for the embodiment shown in FIG. 1, the charge unit is the number of packets so that the charge increases in proportion to the increase of packets. The embodiment is thus effective as a common channel signal path between the stations in which path the traffic intensity is not so large. In the path where the traffic intensity is large, however, it may be more effective to allocate the common channel signal path to a specific channel of the leased lines. If the common channel signal path is allocated to the leased line in the office network, the embodiment shown in FIG. 6 is a method and system for alternating the common channel signal path arranged by the embodiment shown in FIG. 1 using the ISDN as an alternating circuit used when failure takes place in the common channel signal path.

The common channel signal path having the redundant arrangement shown in FIG. 6 will be operated as follows. The signal path (1) is used if no failure takes place in the signal path (1) to which one channel of the leased line 7' is allocated between the switching stations 1 and 1'. If failure takes place in the signal path (1), the signal path (2) containing the ISDN 8 designed according to the embodiment shown in FIG. 1 is employed for transferring a signal line signal. For the purpose, the signalling devices 13, 13' of the switching stations 1 and 1' monitor if the common channel signal path (1) is normal and notifies the central control devices 3, 3' of failure caused in the signal path (1). When failure is detected in the common channel signal path (1), the central control devices 3, 3' serve to initialize the signalling devices 13, 13' and the signalling devices 13, 13' have a function of notifying the central control devices 3, 3' of recovery of the signal path (1). Hence, the central control devices 3, 3' serve to select the signal path (1) if it is normal and realize a function of alternating the signal path (2) using the ISDN 8 if failure takes place in the signal path (1).

The embodiment shown in FIG. 1 has been designed to make a charge depending on the number of signal packets, that is, the number of calls, unlike the arrangement designed to transfer a common channel signal through the leased line. Hence, if the large number of calls are set up between the switching stations, the use of the leased lines may be more economical than the use of the ISDN designed in the embodiment. Even if, however, the use of the lease lines is more economical, the signalling device and the signal path may often employ redundant arrangement, because they have to be operated if failure takes place therein. Hence, if the signal path containing the ISDN is applied as an alternate path to be used when failure takes place in the signal path or the signalling device, it is possible to make more effective use of the line and reduce the cost of the signalling device.

According to the invention, the common channel signalling system makes it possible to establish the common channel signal path through the ISDN without having to use the dedicated signal path in transferring setup information between the switching stations. It is especially effective for the arrangement of the common channel signalling network between small-scaled switching stations each having small traffic intensity.

If the leased line is used between the switching stations having large traffic intensity, the signal path containing the ISDN can be applied as an alternate circuit for the signal path and the signalling device employing redundant arrangement as a result of considering failure caused therein. This results in making more effective use of the line and reducing the cost of the signalling device.

What is claimed is:

1. A method for arranging a common channel signal network designed to transfer a common channel signal containing call setup information between a sending side station and a receiving side station while control signals and data are transmitted through information channels connected between said stations, comprising the steps of:

allocating a common channel signal path for carrying only said common channel signal to a path extending between said stations through an ISDN when a predetermined event has occurred;

temporarily establishing as said common channel signal path a connection between said stations through said ISDN using a channel in said ISDN used to control call setup between said ISDN and a terminal when said predetermined event has occurred;

transferring said common channel signal between said stations through said connection established through said ISDN; and releasing said connection established through said ISDN after completion of transfer of said common channel signal.

2. A method for arranging a common channel signal network designed to transfer a common channel signal containing call setup information between a sending side station and a receiving side station while control signals and data are transmitted through information channels connected between said stations, comprising the steps of:

transferring said common channel signal through a common channel signal path provided by a leased line connected between said stations, said common channel signal path carrying only said common channel signal;

temporarily establishing as said common channel signal path a connection between said stations through an ISDN using a channel in said ISDN used for controlling call setup between said ISDN and a terminal, when a failure occurs in said leased line;

transferring said common channel signal between said stations through said established connection through said ISDN when a failure occurs in said leased line; and releasing said established connection through said ISDN after completion of transfer of said common channel signal.

3. A system for arranging a common channel signal network designed to transfer a common channel signal containing call setup information between a sending side station and a receiving side station, comprising:

first and second switching stations provided respectively in said sending and receiving side stations, each connected to terminals;

a relay line connected between said first and second switching stations and used as a speech path; and an ISDN provided between said first and second switching stations in a manner to connect said switching stations, wherein each switching station comprises:

a speech path relaying device connected to said relay line, an ISDN relaying device connected to said ISDN, and means for controlling call setup between a terminal and said speech path relaying device to form a speech path for transmitting speech data between said switching stations, temporarily establishing a connection, for carrying only said common channel signal, between said switching stations through said ISDN using a channel in said ISDN used to control call setup between said ISDN and said terminal when a predetermined event has occurred, transferring, while transmitting speech data between said switching stations, said common channel signal between said switching stations through said ISDN relay device and said ISDN on said established connection when said predetermined event has occurred, and releasing said established connection after completion of transfer of said common channel signal.

4. The system for arranging a common channel signal network as in claim 3, wherein said means for controlling comprises:

a call setup control section for interpreting dial digits sent from a terminal of another switching station, selecting said speech relay device and controlling the setup between said terminals; and a signal packet handling section having a function of transferring said common channel signal to be received in or sent from said call setup control section between said first and second switching stations through said ISDN as well as a function of editing signal packets, routing said signal packets and controlling the I/O of said signal packets to or from a channel used for controlling the setup.

5. A system for arranging a common channel signal network designed to transfer a common channel signal containing call setup information between a sending side station and a receiving side station, comprising:

first and second switching stations provided respectively in said sending and receiving side stations, each connected to terminals;

a first relay line connected between said first and second switching stations and used as a speech path;

a second relay line connected between said first and second switching stations and including speech and a common channel signal path channel for carrying only said common channel signal; and an ISDN provided between said first and second switching stations in a manner to connect said switching stations, wherein each station comprises:

first and second speech path relay devices respectively connected to said first and second relay lines, a signalling device for transferring a common channel signal to said common channel signal path channel provided on said second relay line, an ISDN relay device connected to said ISDN, and means for controlling connection between a terminal and said first and second speech path relay devices to form a speech path for transmitting speech data between said switching stations, temporarily establishing a connection between said switching stations through said ISDN using a channel in said ISDN used for controlling call setup between said ISDN and said terminal when a predetermined event has occurred, transferring, while transmitting said speech data between said switching stations, said common channel signal between said switching stations through said ISDN relay device and said ISDN on said established connection when said predetermined event has occurred, and releasing said established connection after completion of transfer of said common channel signal.

6. A method for arranging a common channel signal network designed to perform a relay function between switching stations and transfer a common channel signal containing call up information between said switching stations in a common channel signalling manner while control signals and data are transmitted through information channels connected between said switching stations, comprising steps of:

temporarily using a call setup channel between an ISDN and a terminal as a common channel signal path for carrying only said common channel signal between said switching stations;

releasing said call setup channel after completion of carrying said common channel signal between said switching stations; and establishing a connection between said switching stations for each call in a fixed manner.

7. A method for arranging a common channel signal network through an ISDN designed to transfer a common channel signal between switching stations in a common channel signalling manner while control signals and data are transmitted through information channels connected between said switching stations, comprising the steps of:

temporarily establishing a connection between said switching stations using a channel in said ISDN used for controlling the call setup between said ISDN and a terminal as a common channel signal path for carrying only said common channel signal;

transferring said common channel signal through a connection established on a leased line when failure takes place in the common channel signal network; and releasing said connection established on said leased line upon completion of transfer of said common channel signal.

* * * * *